United States Patent
Adib et al.

(10) Patent No.: US 8,750,849 B1
(45) Date of Patent: Jun. 10, 2014

(54) SYSTEM AND METHOD FOR PROVIDING WIRELESS COMMUNICATION DURING RADIO ACCESS NETWORK OVERLOAD CONDITIONS

(75) Inventors: Fared A. Adib, Overland Park, KS (US); Joshua R. Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 7 days.

(21) Appl. No.: 13/540,442

(22) Filed: Jul. 2, 2012

(51) Int. Cl.
*H04M 3/42* (2006.01)

(52) U.S. Cl.
USPC ........ 455/417; 455/416; 455/412.2; 455/519; 455/458

(58) Field of Classification Search
CPC ...... H04W 40/24; H04W 3/533; H04W 3/543
See application file for complete search history.

(56) References Cited

U.S. PATENT DOCUMENTS

| | | | |
|---|---|---|---|
| 5,663,717 A * | 9/1997 | DeLuca | 340/323 R |
| 5,748,100 A * | 5/1998 | Gutman et al. | 340/7.22 |
| 2005/0107095 A1* | 5/2005 | Samuel | 455/456.5 |
| 2005/0117714 A1* | 6/2005 | Chingon et al. | 379/88.12 |
| 2007/0202895 A1* | 8/2007 | Benco et al. | 455/466 |
| 2010/0297986 A1* | 11/2010 | Cermak et al. | 455/414.1 |
| 2011/0230184 A1* | 9/2011 | Tal et al. | 455/425 |
| 2013/0195264 A1* | 8/2013 | Kirchhoff et al. | 379/212.01 |

* cited by examiner

*Primary Examiner* — Rafael Pérez-Gutiérrez
*Assistant Examiner* — Keith Fang

(57) ABSTRACT

A method of cellular wireless communication. The method comprises identifying a traffic channel congestion condition in a radio access network and transmitting information about the traffic channel congestion to at least one mobile phone via a control channel.

20 Claims, 8 Drawing Sheets

SYSTEM AND METHOD FOR PROVIDING WIRELESS COMMUNICATION DURING RADIO ACCESS NETWORK OVERLOAD CONDITIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication coverage for mobile communication devices, such as mobile phones, is widely available in the United States. Cell towers provide on-demand radio wireless communication links to mobile devices, and the communication may be continued over wires and/or land lines. Cell towers are typically engineered to be capable of maintaining a limited number of concurrent wireless traffic channels. Generally, the network of cell towers that provide wireless communication coverage is engineered to provide on-demand wireless communication links to the mobile devices, but during peak load conditions some of the mobile phones seeking to obtain a traffic channel—channel for carrying the communication content such as voice call content or data call content—are unable to obtain a traffic channel.

SUMMARY

In an embodiment, a method of cellular wireless communication is disclosed. The method comprises identifying a traffic channel congestion condition in a radio access network, receiving a call origination attempt from a mobile phone, wherein the call cannot be completed initially because of the traffic channel congestion condition, and storing information about the origination attempt in a call set-up queue, wherein the information about the origination attempt comprises an identification of a called party and an identification of the mobile phone. The method further comprises transmitting information about the traffic channel congestion condition to the mobile phone via a control channel, connecting to the called party identified in the information about the origination attempt stored in the call set-up queue, and connecting the called party to the mobile phone identified in the information about the origination attempt stored in the call set-up queue.

In an embodiment, a method of cellular wireless communication is provided. The method comprises identifying a traffic channel congestion condition in a radio access network and transmitting information about the traffic channel congestion condition to at least one mobile phone via a control channel.

In an embodiment, a mobile phone is provided. The mobile phone comprises, a cellular radio transceiver, a display, a processor, a memory, and an application stored in the memory. When executed by the processor the application determines a traffic channel congestion condition in a cellular radio access network and presents information about the traffic channel congestion on the display when the cellular radio transceiver fails in a call origination attempt.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
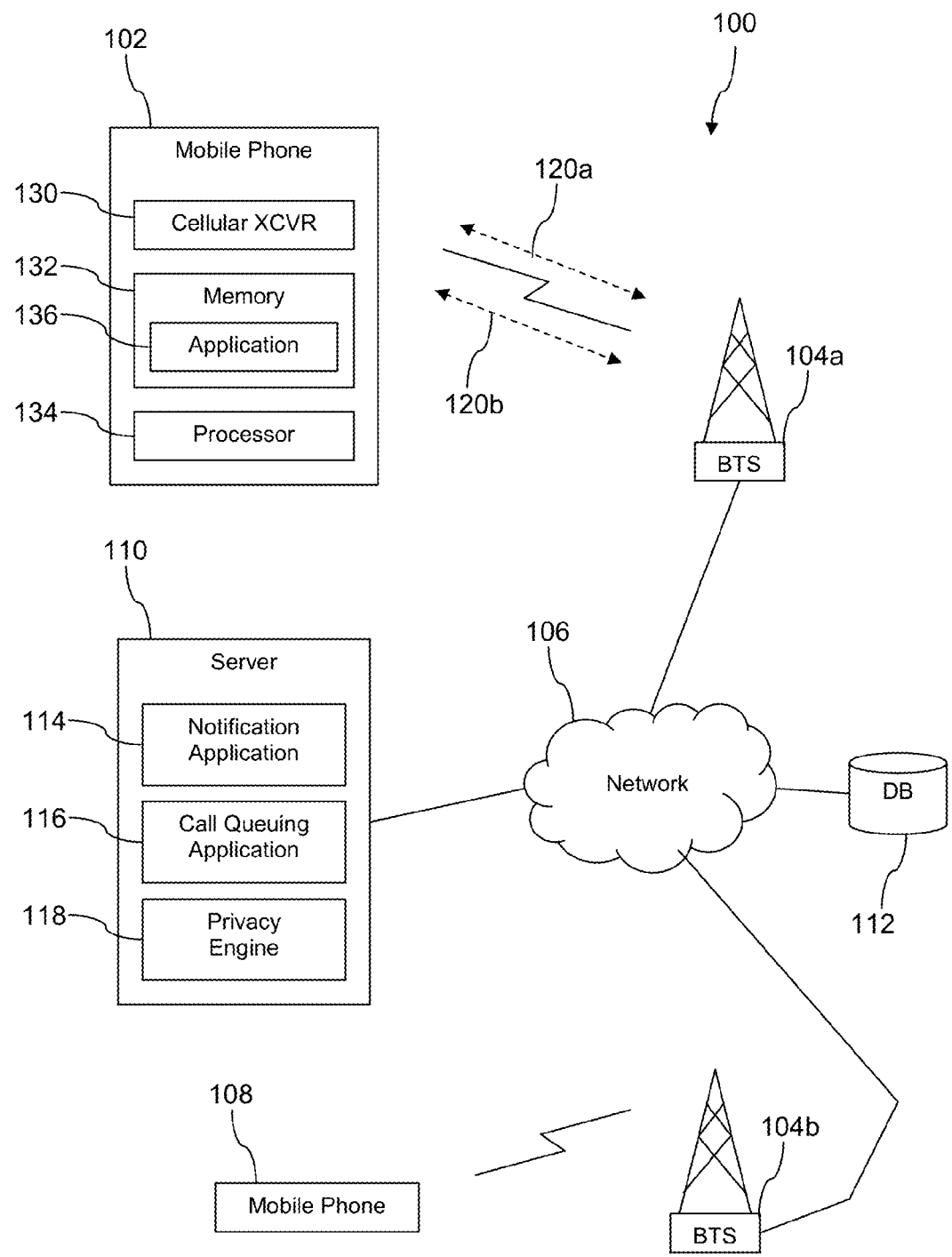
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system and method for providing an improved wireless communication experience during radio access network overload conditions is disclosed. In an embodiment, when a mobile communication device, for example a mobile phone, attempts to originate a wireless call but the radio access network fails to connect the call due to an excessive call load in a coverage area of a cell tower, the mobile communication device may present on a display information about the failed call attempt. For example, the information may indicate that the call cannot be completed due to an excessive call load in the coverage area of the cell tower serving the mobile communication device. Alternatively, the information may indicate that the called device cannot receive the call because the called device is in a coverage area of a cell tower experiencing an excessive call load.

The excessive call load condition, for example the condition where all available wireless traffic channels provided by a cell tower are already used for connected voice calls and/or data calls, may be identified by an application executing on a server in a network. The application may compose a context message comprising an indication of the presumed cause of the excessive call load condition and send the context message to the mobile communication device via a wireless control channel such as a wireless paging channel or some other wireless non-bearer channel. The mobile communication device may then present an associated textual description or notification of the presumed cause of the failed call attempt.

In an embodiment, the application may compose the context message containing a textual message or notification. Alternatively, in an embodiment, the application may compose the context message containing a condition code, for example a single byte, that indicates a presumed cause of the excessive call load condition and send this context message to the mobile communication device. An application on the mobile communication device may map the condition code to a predefined explanatory message stored in a data table or data file on the device and present this stored predefined explanatory message on the display.

Alternatively, the mobile communication device itself may determine the excessive call load condition and present the message on the display of the device. In this case, the mobile communication device may transmit a message to the cell tower and back to the application executing on the server that indicates the excessive call load condition detected by the mobile communication device. The mobile communication device in this case may send the message indicating the excessive call load condition detected by the mobile device via a control channel, via a data channel, or via a non-voice traffic channel.

In an embodiment, the server application may capture information about the wireless call origination attempt and store this information in a first-in first-out queue. When the excessive call load in the radio access network is reduced, the server application may connect the calls that have been stored in the first-in first-out queue. In this embodiment, the message displayed by the mobile communication device may indicate that the attempted call has been enqueued and will automatically connect when the excessive call load decreases. In an embodiment, an estimate of when the call will be dequeued and the call connected is presented in the message. For example, the message may indicate that the call is estimated to be connected in about 8 minutes.

In an embodiment, the server application may store the information captured about the wireless call origination attempt in call priority order, where the priority may be based on a subscriber class of service, a subscriber service plan, or some other priority basis. The information may be stored in a plurality of first-in first-out queues, where each first-in first-out queue is associated with a different priority. For example, a premium subscriber first-in first-out queue may be used to store information captured about wireless call origination attempts made by premium subscribers; a standard subscriber first-in first-out queue may be used to store information about call attempts made by standard subscribers; and a bargain subscriber first-in first-out queue may be used to store information about call attempts made by bargain subscribers. A variety of schemes for completing the calls queued in the plurality of queues may be used. In an embodiment, all calls in the premium first-in first-out queue are connected before any of the calls in the standard or bargain first-in first-out queues are connected; and all calls in the standard first-in first-out queue are completed before any of the calls in the bargain first-in first-out queue are connected. Alternatively, none of the calls in the bargain first-in first-out queues is connected until all of the calls in the premium and standard first-in first-out queues are connected; and two calls in the premium first-in first-out queue are connected for every one call connected from the standard first-in first-out queue. Yet other schemes for connecting calls from the prioritized first-in first-out queues are contemplated by the present disclosure. Further, a different number of queue priorities is contemplated.

In an embodiment, the system may send a context message to a called mobile communication device when a call has been attempted to be completed to that device but failed due to excessive call load in the coverage area where the called device is presently located. The message may indicate the calling party that failed to complete the call to the mobile communication device.

In an embodiment, the system may preload mappings of notifications to condition codes into mobile communication devices in association with scheduled and/or known events. For example, when a football game is scheduled, the system may preload mappings of notifications to condition codes that include a textual message or notification that an incoming call cannot be completed due to the excess call load in the vicinity of the professional football game between the Barbarians and the Huns. As fans drive to the football stadium, their mobile communication devices may be preloaded with this mapping over wireless control channels provided by cell towers surrounding the football stadium. This preloaded mapping may be associated with a lifespan such that the mapping only applies for an eight hour period of time or some other suitable time duration.

The systems of notification and/or call queuing can help to maintain good customer perception of the wireless service provider. As a result of being presented the notification, the customer may understand that the desired call cannot be completed due to unusual excess call load on the cell tower rather than developing a negative impression that the service provider has a poor network. Additionally, the customer may have an improved impression of the service provider if his or her failed call is completed automatically without having to repeatedly reattempt to complete the call. In addition to improving customer impressions of the wireless service provider, the disclosed system can reduce the load on the communication network associated with call origination attempts that are going to fail anyway due to the current excess call load.

Turning now to FIG. 1, a communication system 100 is described. In an embodiment, the system 100 comprises a calling mobile phone 102, a first base transceiver station (BTS) 104a, a network 106, a second BTS 104b, and a called mobile phone 108. It is understood that the system 100 may comprise any number of BTSs 104. The network 106 comprises one or more public communication networks, one or more private communication networks, and/or a combination thereof. In an embodiment the BTS 104a, 104b provide wireless radio access according to at least one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or other wireless protocol. A radio access network may be said to comprise the BTSs 104 that provide access to the network 106 by the mobile phones 102, 108. In some contexts, a BTS may be referred to as a cell tower.

While the system 100 is described with reference to mobile phones 102, 108, the system 100 is suitable for use with other mobile communication devices such as personal digital assistances (PDAs), media players, and other mobile communication devices. Also, though the phone 102 is referred to as the "calling mobile phone 102" and the phone 108 is referred to as the "called mobile phone 108," it is understood that these designations are employed to promote ease of description herein: either of the phones 102, 108 may perform any of the usual functionality associated with mobile phones such as originating voice calls, receiving voice calls originated by another device, originating data calls, sending and receiving text messages, and other known functions of mobile phones.

In an embodiment, the system 100 further comprises a server computer 110 and a data store 112. The server 110 executes one or more of a notification application 114, a call queuing application 116, or a privacy engine 118. In an embodiment, two or more of the components 114, 116, 118 may be combined. In an embodiment, one or more of the components 114, 116, 118 may be implemented as a plurality of sub-components. Computer systems are discussed further hereinafter.

The calling mobile phone 102 may communicate with the BTS 104a on a wireless control channel 120a and on a wireless traffic channel 120b. Wherein after the wireless control channel 120a may be referred to as the control channel 120a and the wireless traffic channel 120b may be referred to as the traffic channel 120b. As used herein, the traffic channel 120b is understood to carry voice content and/or data content. For example, when the calling mobile phone 102 is engaged in a voice call with another party on a phone, the voice from the user of the calling mobile phone 102 is transmitted from the calling mobile phone 102 to the BTS 104a on the traffic channel 120b and the voice from the other party to the voice call is transmitted from the BTS 104a to the calling mobile phone 102 on the traffic channel 120b. By contrast, the control channel 120a is understood to carry all other communications between the calling mobile phone 102 and the BTS 104a. The control channel 120a carries paging information, for example a paging channel. The control channel 120a carries control signaling and/or a control channel. As is well known, short message service (SMS) messages and/or text messages may be transmitted and received via the paging channel and hence, according to the construction of the term control channel used herein, SMS messages are transmitted and received by the calling mobile phone 102 on the control channel 120a.

The traffic channel 120b may be allocated as a dedicated resource to the calling mobile phone 102. For example, when the calling mobile phone 102 has successfully connected in a voice call, a dedicated wireless resource is allocated for that specific voice call. The dedicated wireless resource may comprise both an uplink wireless resource and a downlink wireless resource. In some communication scenarios, the uplink resource may be asymmetrical with reference to the downlink resource. For example, in a data call, or in a particular type of data call, the downlink resource may be associated with a greater bandwidth and/or a greater data throughput capacity than the uplink resource. The dedicated wireless resource may comprise a limited number of radio sub-carriers allocated to the calling mobile phone 102 when an orthogonal frequency division multiplex access (OFDMA) type of wireless protocol is employed, such as in WiMAX or LTE. The dedicated wireless resource may comprise a specific frequency bandwidth or bandwidths that are allocated to the calling mobile phone 102 when a frequency division multiple access (FDMA) type of wireless protocol is employed, such as GSM. The dedicated wireless resource may comprise a specific pseudorandom number sequence that is allocated to the calling mobile phone 102 when a spread-spectrum type of wireless protocol is employed, such as CDMA.

By contrast, the control channel 120a may be used as a shared resource. For example, the BTS 104a may broadcast a control message that identifies a mobile device known to be in the coverage area of the BTS 104a. Likewise, the calling mobile phone 102 may broadcast an origination message that identifies the BTS 104a. Alternatively, in some wireless protocols, the control channel 120a may be managed according to time division multiple access (TDMA) that allocates portions of the control channel for relatively short time durations.

Generally a substantially larger number of mobile phones may be served by the control channels of a BTS than by the traffic channels of a BTS. For example, it may be that the BTS 104a can provide about 50 concurrent voice calls on the traffic channel 120b while it can serve 500 to 5000 mobile phones on the control channel 120a concurrently. As another example, it may be that the BTS 104a can provide about 25 concurrent voice calls on the traffic channel 120b while it can serve 250 to 2500 mobile phones on the control channel 120a concurrently.

When the calling mobile phone 102 attempts to originate a voice call or a data call, the calling mobile phone 102 sends an appropriate call set-up message, origination message, or other message to the BTS 104a on the control channel 120a. If the BTS 104a has available traffic channel wireless resources, the BTS 104a may allocate the traffic channel 120b to the calling mobile phone 102 and connect the call between the calling mobile phone 102 and the called party, for example the called mobile phone 108 or a content server. If the BTS 104a does not have available traffic channel wireless resources, for example if the BTS 104a is already supporting a full complement of voice calls and/or data calls, the BTS 104a will not connect the call. This may happen when a large number of mobile phones are in the coverage area of the BTS 104a, for example when an automobile traffic jam occurs along a multiple lane highway, when a large crowd has gathered to watch a sporting event, when a large crowd has gathered to attend a concert. In some contexts, the imbalance between available traffic channel resources and the number of mobile phones attempting to connect voice and/or data calls may be referred to as a traffic channel congestion condition and/or as traffic channel congestion.

When a user cannot complete a call attempt, the user may repeatedly redial their call. This practice may increase control channel congestion. Additionally, when a user cannot complete a call attempt and experiences continued call completion failures as they repeatedly redial the call, the user may develop an unfavorable perception of the wireless service provider. The present disclosure teaches a system and method of providing contextual information to the calling mobile phone 102 and/or to the called mobile phone 108 that may promote a user understanding and appreciating the cause that call attempts are not being connected. The contextual information may promote the phone 102, 108 presenting on a display textual information or a notification that informs the user of the phone 102, 108 of an on-going communication problem, for example a cause of a failed call attempt or a cause that an in-coming call cannot be received. Additionally, in some embodiments the call attempts are queued and automatically connected without the calling mobile phone 102 having to redial the call, thereby providing the user of the calling mobile phone 102 a better communication experience and promoting a more positive perception of the wireless service provider.

The notification application 114 executing on the server 110 may be aware that the BTS 104a is experiencing traffic channel congestion. For example, a rate of call origination attempt failures may be detected that exceeds some threshold rate. The notification application 114 may command the BTS 104a to forward call origination messages to the notification application 114. The notification application 114 may generate a context message in response to a failed call origination message, send the context message to the BTS 104a, and the BTS 104*a* may send the context message to the calling mobile phone 102 via the control channel 120*a*. In an embodiment, the context message may be sent in a short message system (SMS) message or text message on the control channel 120*a* addressed to the calling mobile phone 102. The SMS message may be a system-type of text message that is not immediately propagated to a text message engine in the calling mobile phone 102 but is instead processed internally, for example processed by handing the SMS message off to an application 136 for processing.

The calling mobile phone 102 may comprises a cellular transceiver 130, a memory 132, and a processor 134. The memory 132 may store the application 136 that, when executed by the processor 134, performs one or more functions associated with improving the user experience when the phone 102 is in the coverage area of a BTS 104*a* that is experiencing traffic channel congestion. The cellular transceiver 130 may receive the context message on the control channel 120*a* and send the context message to the application 136. The application 136 may process the context message and present a notification on a display of the calling mobile device 102 based on the context message.

In an embodiment, the context message may comprise a textual description or notification of a presumed cause of the traffic channel congestion or other information about the traffic channel congestion. For example, the textual description or notification may state "temporary cell tower call overload due to an automobile traffic jam on I-35," "temporary cell tower call overload due to Barbarians versus Huns football game," "temporary cell tower call overload due to restarting cell tower electronics," "temporary cell tower call lock out due to emergency first responder access priority," or the like. Sending a context message that comprises free field text may provide high flexibility in the detail of information that can be provided as a context message. Wireless service provider personnel, for example personnel working in a network operations center (NOC), may monitor the radio access network for traffic channel congestion conditions, identify a presumed primary cause of the traffic channel congestion, and type in a short textual description based on their knowledge of the primary cause of the traffic channel congestion as the textual description. This same short textual description may be automatically sent out by the notification application 114 on the event of failed call attempts by calling mobile phones 102 in the coverage area of the BTS 104*a*, for example to any of a plurality of phones 102 that are in the coverage area of the BTS 104*a* that experience call attempt failures.

When the traffic channel congestion condition dissipates, the notification application 114 may tell the BTS 104*a* to discontinue sending call origination attempt messages to the notification application 114. Should a traffic channel congestion condition develop again in the future, where the failed call attempt rate exceeds the predefined failure rate threshold, the notification application 114 may again instruct the BTS 104*a* to send call origination attempt messages.

In another embodiment, the context message may comprise a condition code, for example a single byte or two bytes, rather than free field text, for example to reduce the loading on the control channel 120*a*. The application 136 may be configured with a predefined mapping that translates and/or associates the condition code into an associated textual message. For example, a '1' value may map to a "temporary cell tower call overload due to transient cell tower maintenance" textual message, a '2' value may map to a "temporary cell tower call overload due to an automobile traffic jam" textual message, a '3' value may map to a "temporary cell tower call overload due to large sports event" textual message, and other similar mappings. While these textual messages may not provide as much specific detail as in the free field text described further above, they still provide explanatory contextual information. In some contexts, the condition code may be referred to as a code.

In an embodiment, the condition code to notification mapping may be transmitted to a mobile phone from the notification application 114 over-the-air via the control channel 120*a*. Alternatively, in an embodiment, the condition code to notification mapping may be transmitted to a mobile phone over-the-air via the traffic channel 120*b*. For example, a mobile phone operated in Chicago may be configured over-the-air with a first mapping that is appropriate for the Chicago area, a mobile phone operated in Dallas may be configured over-the-air with a second mapping that is appropriate for the Dallas area, and a mobile phone operated in Gillette, Wyo., may be configured over-the-air with a third mapping that is appropriate for the Gillette area. The condition code to notification mapping may be updated over-the-air seasonally, monthly, weekly, or on some other interval. The condition code to notification mapping may be updated over-the-air aperiodically, based on some unplanned event. The condition code to notification mapping may be defined based on known schedules of events such as professional sports games, music concerts, or based on historic patterns.

In an embodiment, a condition code to notification mapping may be provided selectively to mobile phones based on location. For example, a condition code to notification mapping that associates a condition code to a textual message about a specific sporting event may be transmitted over-the-air to mobile phones that are located in coverage areas proximate to the subject sporting event.

Figure 2:
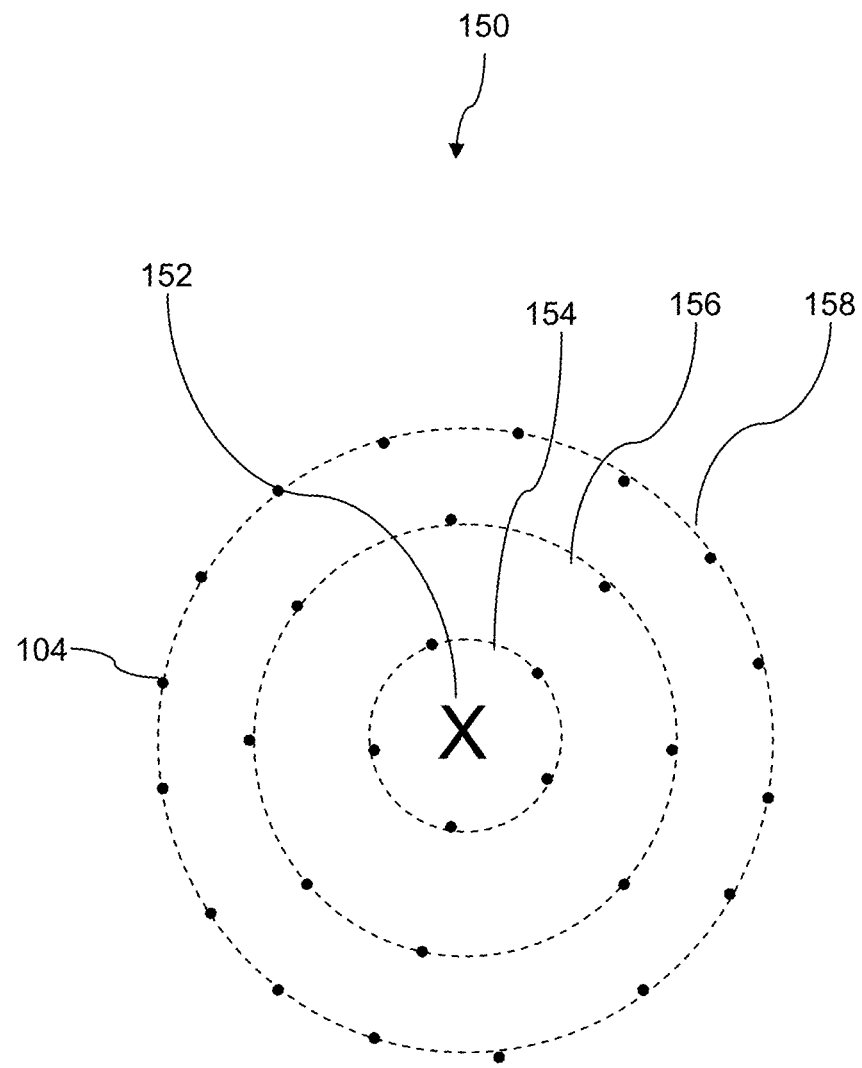
FIG. 2 is an illustration of a wireless communication area according to an embodiment of the disclosure.

Turning now to FIG. 2, a region 150 comprising BTSs 104 in proximity to an event venue is described. For example, an event such as a professional football game, a professional baseball game, a professional hockey game, a professional basketball game, a music concert, or other popular event is scheduled to take place at an event venue 152. The event venue 152 is served by a first ring 154 of BTSs 104. The first ring 154 is surrounded by a second ring 156 of BTSs 104. The second ring 156 is surrounded by a third ring 158 of BTSs 104. It is understood that the BTSs 104 in the proximity of the event venue 152 may have other spatial distributions than the simple concentric ring distribution illustrated in FIG. 2.

At a first time, mobile phones in the coverage of the BTSs 104 constituting the first ring 154 may be updated over-the-air with a mapping that defines an association between a condition code and a textual message associated with the scheduled event. At a second time that is later than the first time, mobile phones in the coverage of BTSs 104 constituting the second ring 156 may be updated over-the-air with a mapping that defines the association between the condition code and the textual message associated with the scheduled event. At a third time that is later than the second time, mobile phones in the coverage of BTSs 104 constituting the third ring 158 may be updated over-the-air with the mapping that defines the association between the condition code and the textual message associated with the scheduled event. It may be that a predictable automobile traffic flow occurs such that the described sequencing manages the over-the-air transmission of the specific mapping between the condition code and the textual message associated with the scheduled event without overloading the control channel 120*a* and/or without overloading the processing capacity of the subject BTSs 104.

Turning again to FIG. 1, in an embodiment, the call queuing application 116 stores information contained in the call origination messages forwarded by the BTS 104*a*. For example, the call queuing application 116 may read a phone number or other identification associated with the calling mobile phone 102 and a phone number or other identification associated with the called mobile phone 108 and store this information in a first-in first-out (FIFO) data structure in the data store 112. When the traffic channel congestion condition dissipates, the call queuing application 116 may complete call set up for each of the queued calls that were stored in the data store 112 in first-in first-out order. During the dequeuing of failed call attempts, new call origination messages sent to the BTS 104a may continue to enqueue into the first-in/first-out queue, so as to honor the precedence of the earlier failed call attempts. Alternatively, in another embodiment, the call attempts messages that are received by the BTS 104a may be connected substantially concurrently with the connection of the queued calls.

In an embodiment, the call queuing application 116 may estimate a time when a queued call will be dequeued and connected, and the notification application 114 may transmit this information with the context message sent to the BTS 104a and thence sent to the application 136. In an embodiment, the estimate of when the queued call will be connected may be encoded as a short code, as a 4-bit number or some other short number that maps to a relatively small number of call delays. For example 1 may map to 1 minute, 2 may map to 2 minutes, 3 may map to 3 minutes, 4 may map to 4 minutes, 5 ma map to 5 minutes, 6 may map to 8 minutes, 7 may map to 10 minutes, 8, may map to 15 minutes, 9 may map to 20 minutes, 10 may map to 30 minutes, etc. It is understood that other mappings from short code to an estimated call connection delay may be employed.

In an embodiment, if the calling mobile phone 102 is attempting to connect to the called mobile phone 108 while the BTS 104b is experiencing traffic channel congestion, the call attempt likewise will fail. The notification application 114 and the call queuing application 116 may send a context message to the calling mobile phone 102 and queue the call for first-in first-out call connection substantially as described above. In this case, however, the context message may provide information to the effect that the called party is in a coverage area experiencing a temporary cell tower call overload due to a particular event or condition. The context message may provide information about what the subject event may be, for example a football game between the Barbarians and the Huns. The notification application 114 may also send a context message to the called mobile phone 108 that indicates, either by including a textual description or notification of by including a condition code in the context message, that an in-coming call has not been able to be connected to the phone 108. In an embodiment, the context message sent to the called mobile phone 108 may further indicate a number of the calling mobile phone 102.

In an embodiment, the context message provided to the calling mobile phone 102 when the traffic channel congestion is experienced by the called mobile phone 108 may be processed by the privacy engine 118. For example, the user of the called mobile phone 108 may not want to permit the server 110 to inform any calling mobile phone of the location of the called mobile phone 108. This is, essentially, an issue of managing the privacy of the user of the mobile phone. In an embodiment, a subscriber for wireless communication services, for example the user of the called mobile phone 108, may define a privacy profile that is stored by the privacy engine 118 and/or the server 110 on the data store 112. The privacy profile may say that no location information may be shared with any calling party when the subject called mobile phone 108 is experiencing a traffic channel congestion condition. The privacy profile may identify communities of calling mobile phones 102 that may be allowed different levels of access to private location information. The privacy engine 118 analyzes the identity of the calling mobile phone 102 based on rules and/or privacy profiles defined for the called mobile phone 108 and modifies the context message sent to the calling mobile phone 102 accordingly. Alternatively, the notification application 114 may request the privacy engine 118 to return a defined privacy level based on the identities of the calling mobile phone 102 and the called mobile phone 108, and the notification application 114 may itself then create a context message based on this privacy level for transmitting to the application 136 via the control channel 120a.

In an embodiment, the calling mobile phone 102 may itself detect that the BTS 104a is experiencing traffic channel congestion, for example based on repeated failed call origination attempts. The calling mobile phone 102 may detect the traffic channel congestion condition based on determining that it has experienced a predefined number of failed call origination attempts within a predefined call window. In the invent of this detection, the calling mobile phone 102 may present an appropriate notification on the display and may also send a message to the BTS 104a on the control channel 120a indicating the presumed traffic channel congestion condition. The BTS 104a may send a message to the server 110 and/or the notification application 114 that indicates the presumed traffic channel congestion condition.

Figure 3:
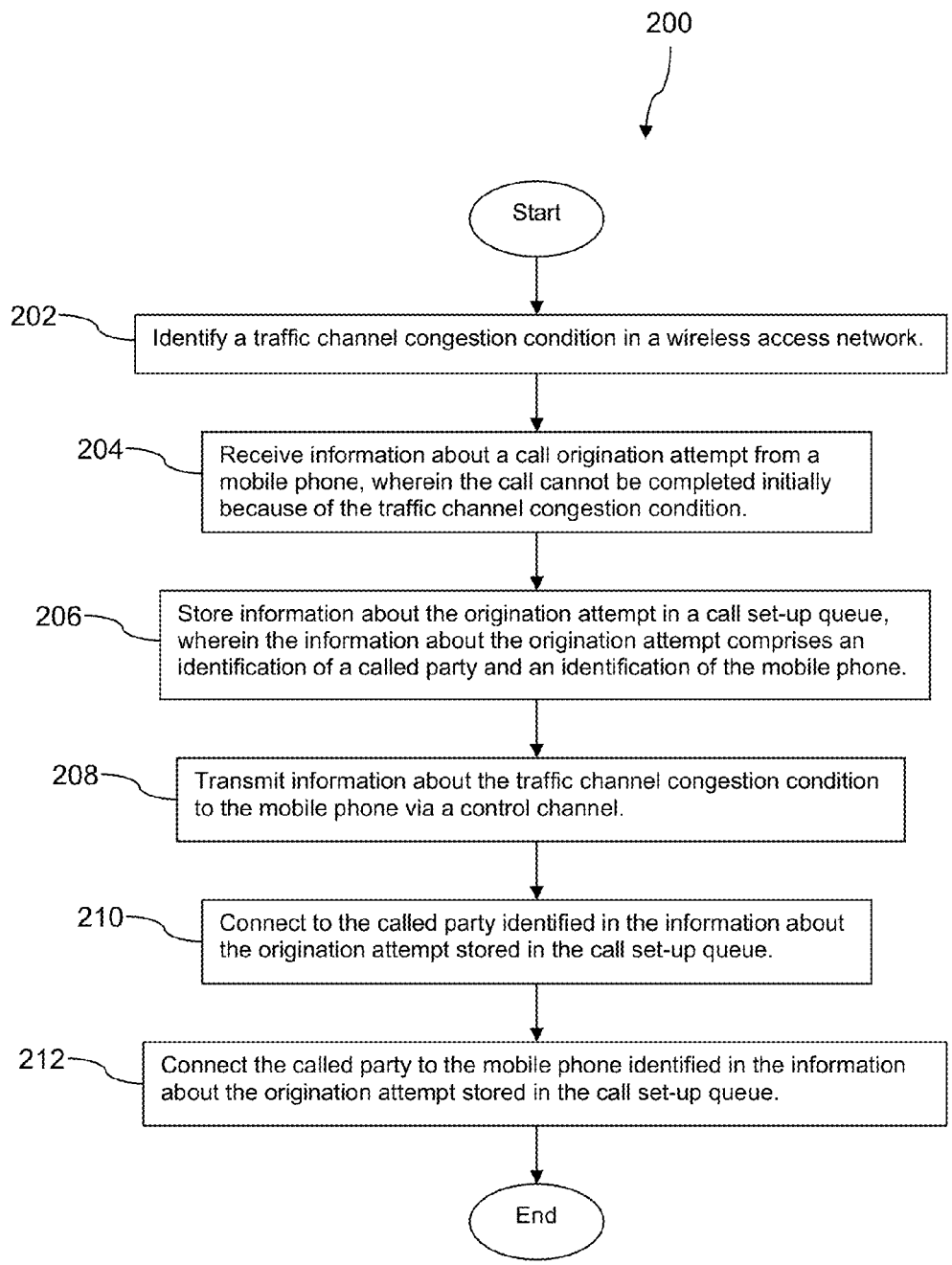
FIG. 3 is a flow chart of a method according to an embodiment of the disclosure.

Turning now to FIG. 3, a method 200 is described. At block 202, a wireless traffic channel congestion condition in a radio access network is identified. For example, the notification application 114 executing on the server 110 or another entity determines that a rate of failed call origination attempts of at least one BTS 104 is exceeding a predefined threshold. In an embodiment, the BTS 104 itself may determine the traffic channel congestion condition and send the information to the server 110 and/or the notification application 114.

At block 204, information about a call origination attempt from a mobile phone is received by the server 110 and/or the notification application 114, where the call cannot be completed initially because of the traffic channel congestion condition. At block 206, information about the origination attempt is stored in a call set-up queue, wherein the information about the origination attempt comprises an identification of a called party and an identification of the mobile phone. For example, an identification of the called mobile phone 108 and an identification of the calling mobile phone 102 is stored as an entry in the call set-up queue. The call set-up queue may be stored in the data store 112. The call set-up queue may comprise a first-in/first-out queue.

At block 208, information about the traffic channel congestion condition is transmitted to the mobile phone, for example the calling mobile phone 102, via a wireless control channel, for example the control channel 120a. The information may provide contextual information as described above about the traffic channel congestion condition. The information may provide an estimate for a call connection delay. At block 210, establish a connection to the called party identified in the information about the origination attempt stored in the call set-up queue. For example, connect to the called mobile phone 108 over a traffic channel 120b. At block 212, connect to the called party to the mobile phone identified in the information about the origination attempt stored in the call set-up queue. For example, connect the call from the called mobile phone 108 back to the calling mobile phone 102 via the traffic channel 120b.

Figure 4:
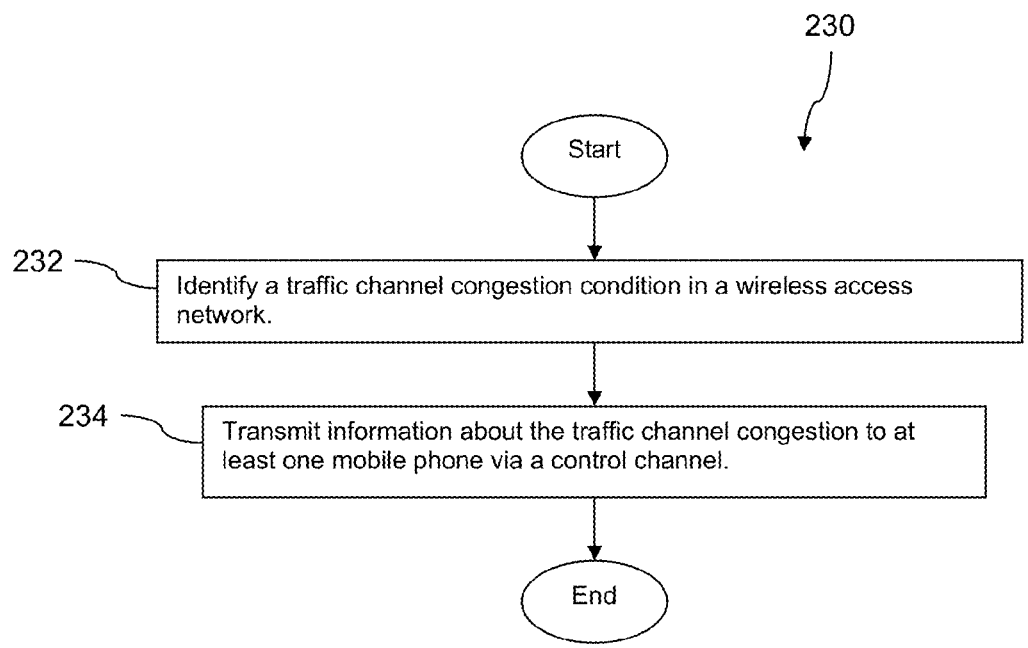
FIG. 4 is a flow chart of another method according to an embodiment of the disclosure.

Turning now to FIG. 4, a method 230 is described. At block 232, a wireless traffic channel congestion condition in a wireless network is identified. For example, a rate of failed call origination attempts exceeds a threshold rate. At block 234, information about the traffic channel congestion is transmitted to at least one mobile phone via a wireless control channel 120a.

Figure 5:
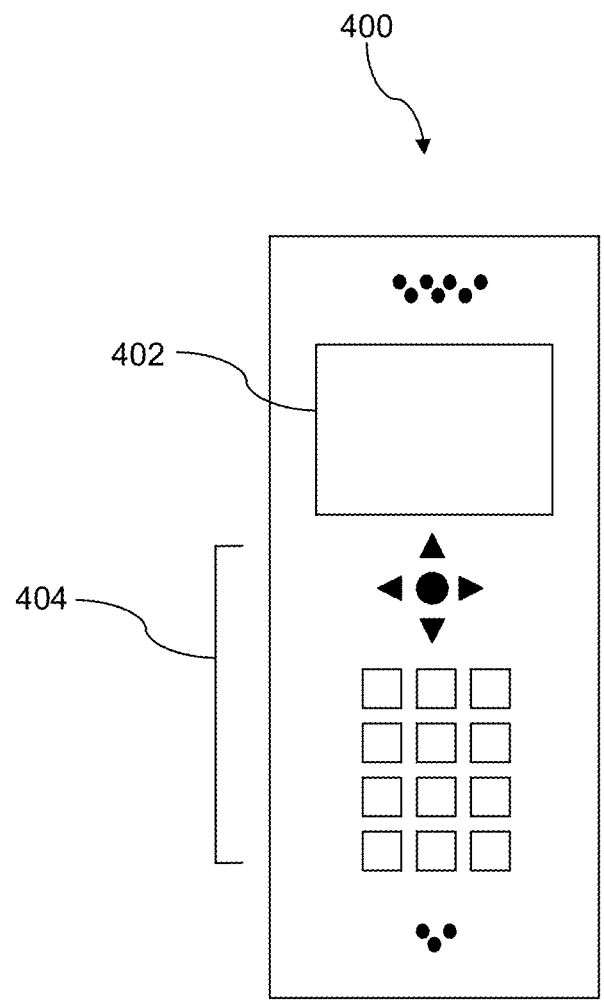
FIG. 5 is an illustration of a mobile phone according to an embodiment of the disclosure.

FIG. 5 depicts a mobile communication device 400, which is operable for implementing aspects of the present disclosure, but the present disclosure should not be limited to these implementations. For example, in an embodiment, the mobile phone 102, 108 may be implemented in a form substantially similar to that of the mobile device 400. The device 400 may take various forms including a wireless handset, a mobile phone, a pager, a personal digital assistant (PDA), a gaming device, or a media player. The device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

As is understood by those skilled in the art, the wireless communication link between the mobile phone 102, 108 and the BTS 104a, 104b may comprise a plurality of uplink and downlink channels. For example, the mobile phone 102 may communicate with the BTS 104a over a traffic channel 120b comprising a downlink traffic channel and an uplink traffic channel. The mobile phone 102 may also communicate with the BTS 104a over a control channel 120a. The control channel 120a may comprise a paging channel, a downlink control channel, and/or an uplink control channel. As used herein, the traffic channel 120b is understood to carry the communication content that the system 100 is provided to carry, for example voice call content and/or data call content. For example, the traffic channel 120b may carry data such as HTML content downloaded from a content server coupled to the network 106. By contrast, the control channel 120a is understood to comprise the control channels, the signaling channels, the paging channels. As is known to those skilled in the art, short message service (SMS) messages or text messages are commonly sent via the paging channel and hence via what is construed as the control channel 120a.

Figure 6:
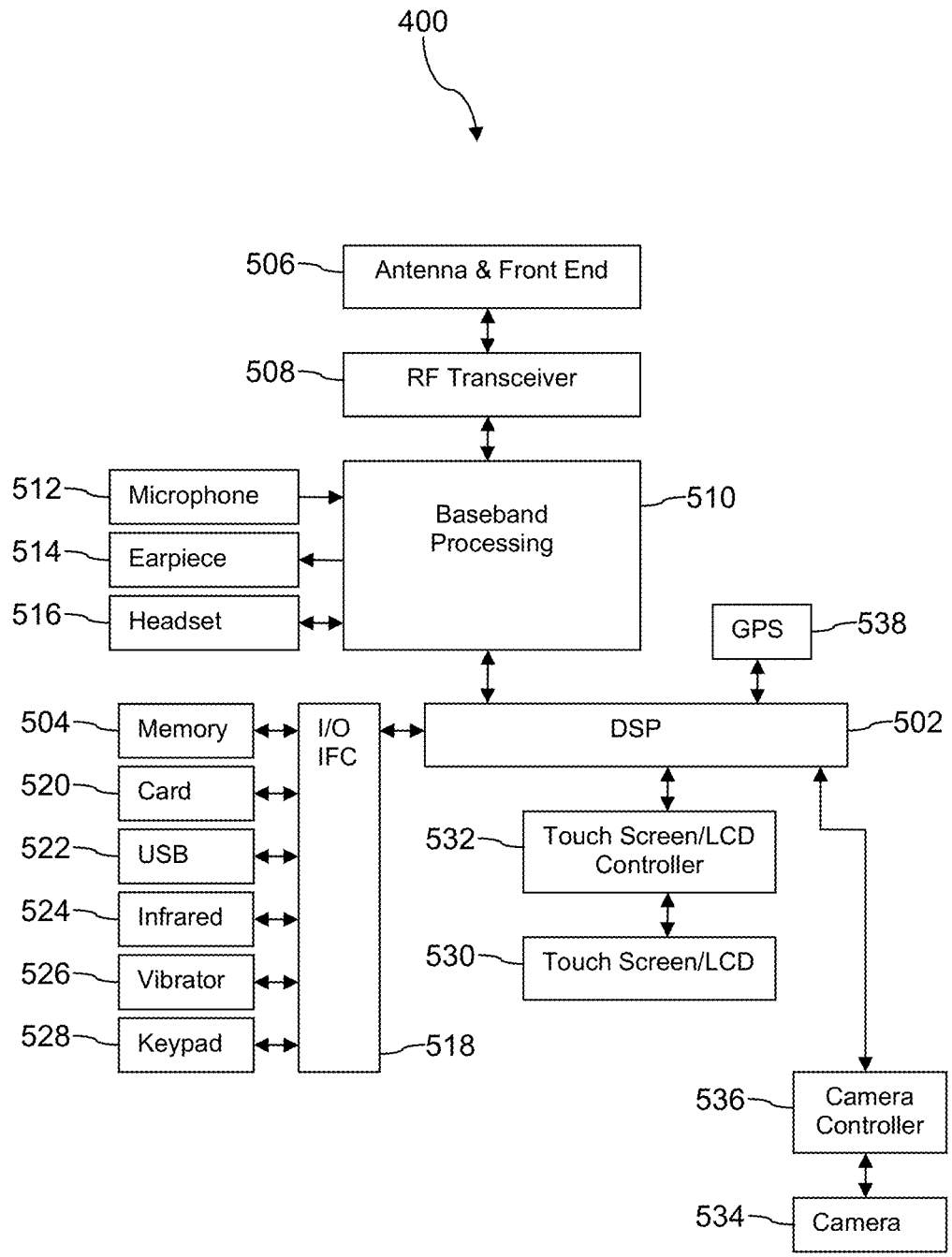
FIG. 6 is an illustration of a hardware architecture of a mobile phone according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
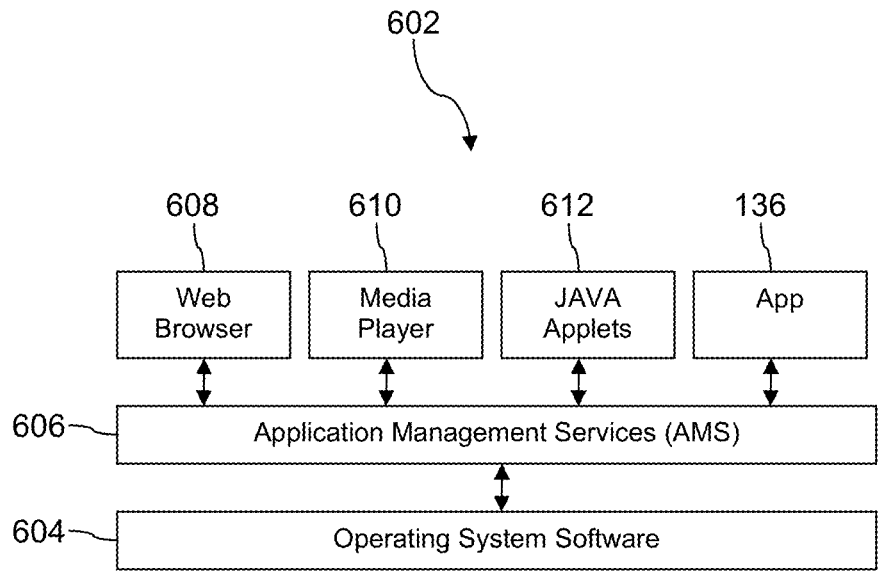
FIG. 7A is an illustration of a software architecture of a mobile phone according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
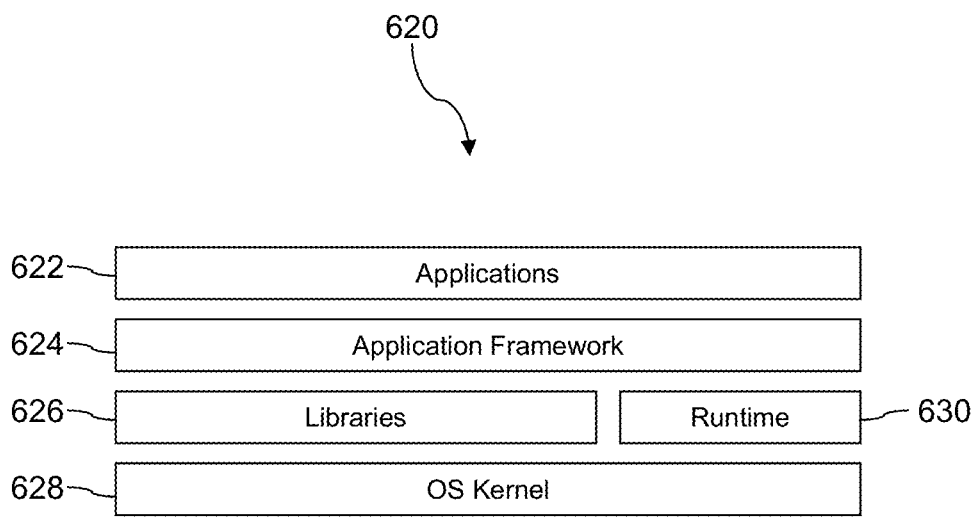
FIG. 7B is an illustration of another software architecture of a mobile phone according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
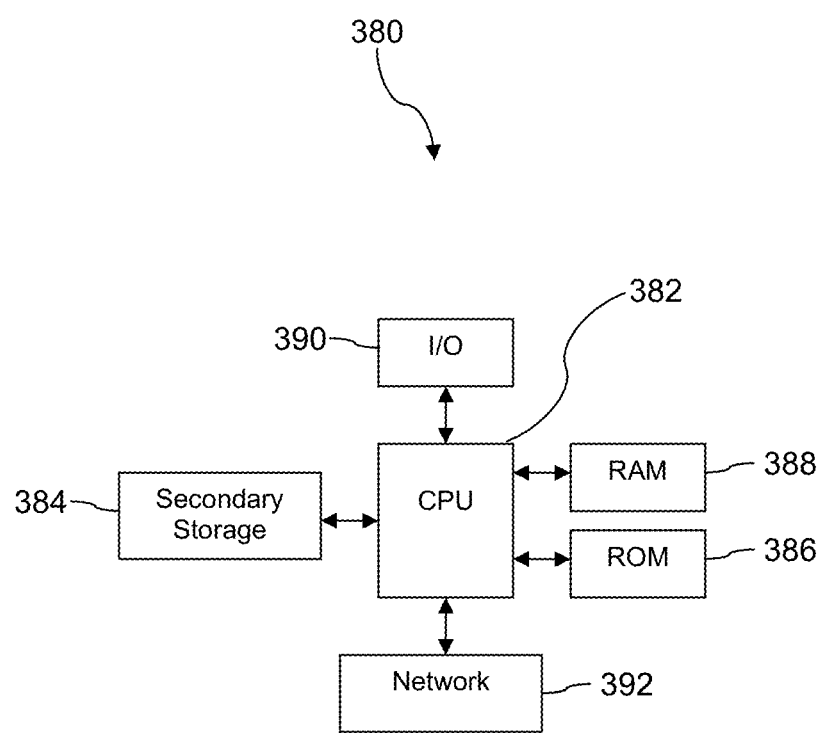
FIG. 8 illustrates a computer system according to an embodiment of the disclosure.

FIG. 8 illustrates a computer system 380 suitable for implementing one or more embodiments disclosed herein. For example, in an embodiment the server 110 may be implemented as a computer system such as system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing wireless communication during radio access network overload conditions caused by an event in an area served by one or more cell towers of a radio access network, comprising:

identifying, by a radio access network server, a traffic channel congestion condition in the radio access network that prevents use of a wireless traffic channel of the radio access network in the area served by the one or more cell towers;

transmitting, by the radio access network server to one or more mobile phones in the area, a plurality of condition codes and a corresponding plurality of predefined causes of traffic channel congestion conditions for storage in a non-transitory memory of the one or more mobile phones, wherein at least one of the plurality of redefined causes comprises a sporting event or a concert;

receiving, by the radio access network server, a call origination attempt from a mobile phone, wherein the call cannot be completed initially because the traffic channel congestion condition prevents use of the wireless traffic channel;

storing information about the call origination attempt in a call set-up queue, wherein the information about the call origination attempt comprises an identification of a called party and an identification of the mobile phone;

transmitting information about the traffic channel congestion condition to at least one mobile phone of the one or more mobile phones via a control channel,
wherein the information comprises a condition code of the plurality of condition codes corresponding to the traffic channel congestion condition that the at least one mobile phone maps to one of the plurality of predefined causes, and
wherein the one of the plurality of predefined causes is presented as a textual description on a display of the at least one mobile phone;

detecting when the traffic channel congestion condition decreases and the wireless traffic channel is available; and in response to the detecting, retrieving information from the call set-up queue and automatically completing a call between the mobile phone and the called party identified in the information.

2. The method of claim 1, wherein the control channel is a cellular wireless paging channel.

3. The method of claim 1, wherein the mobile phone communicates based on one of a code division multiple access (CDMA) wireless protocol, a global system for mobile communications (GSM) wireless protocol, a long term evolution (LTE) wireless protocol, or a worldwide interoperability for microwave access (WiMAX) wireless protocol.

4. The method of claim 1, wherein the information about the traffic channel congestion condition further comprises an estimate of a time delay to expect before the traffic channel congestion condition dissipates such that the wireless traffic channel is made available for a first time to connect the mobile phone to the called party over the wireless traffic channel.

5. The method of claim 1, further comprising sending a context to a plurality of mobile phones, that are proximate to the area of the radio access network experiencing the traffic channel congestion condition, wherein the context message comprises a textual description of a presumed cause of the traffic channel congestion condition.

6. The method of claim 1, wherein the sporting event comprises one of a baseball game, a football game, a hockey game, or a basketball game.

7. A method for providing wireless communication during radio access network overload conditions caused by an event in an area served by one or more cell towers of a radio access network, comprising:
identifying, by a radio access network server, a traffic channel congestion condition in the radio access network that prevents use of a wireless traffic channel of the radio access network in the area served by the one or more cell towers;
transmitting, by the radio access network server to one or more mobile phones in the area, a plurality of condition codes and a corresponding plurality of predefined causes of traffic channel congestion conditions for storage in a non-transitory memory of the one or more mobile phones, wherein at least one of the plurality of predefine causes comprises a sporting event or a concert;
receiving, by the radio access network server, a call origination attempt from a mobile phone, wherein the call cannot be completed initially because the traffic channel congestion condition prevents use of the wireless traffic channel;
transmitting information about the traffic channel congestion condition to at least one mobile phone of the one or more mobile phones via a control channel,
wherein the information about the traffic channel congestion condition comprises a condition code of the plurality of condition codes that is convertible, by the at least one mobile phone, to a predefined cause of the plurality of predefined causes of the traffic channel congestion condition, and
wherein the predefined cause is presented as a textual description on a display of the at least one mobile phone,
detecting when the traffic channel congestion condition decreases and the wireless traffic channel is available; and
in response to the detecting, automatically completing a call between the mobile phone and a called party identified in information from a call set-up queue.

8. The method of claim 7, wherein the at least one mobile phone, to which the information about the traffic channel congestion condition is sent, is in a coverage area of the radio access network that is experiencing the traffic channel congestion condition.

9. The method of claim 7, wherein the at least one mobile phone, to which the information about the traffic channel congestion condition is sent, has attempted to originate the call to the called party over the wireless traffic channel of the radio access network, and where the called party is in a coverage area of the radio access network that is experiencing the traffic channel congestion condition.

10. The method of claim 9, further comprising processing a privacy rule defining an access of the mobile phone to information about the location of the called party.

11. The method of claim 10, wherein based on authorizing the one mobile phone to receive information about the location of the called party, the information about the traffic channel congestion condition identifies the traffic channel congestion condition preventing the called party from receiving the call from the mobile phone as due to the called party being located proximate to one of a specific baseball game, a specific football game, a specific basketball game, a specific hockey game, or a specific concert.

12. The method of claim 7, further comprising sending a message to a plurality of mobile phones proximate to a coverage area in advance of a predicted traffic channel congestion condition in the coverage area of the radio access network, wherein the message comprises a mapping from a code to an identification of a specific cause of the predicted traffic channel congestion condition that is presented as a textual description on a display of each of the plurality of mobile phones.

13. The method of claim 12, wherein the message further comprises an expiration period for the mapping.

14. A mobile phone, comprising:
a cellular radio transceiver;
a display;
a processor;
a non-transitory memory; and
an application stored in the non-transitory memory that, when executed by the processor,
receives a plurality of condition codes and a corresponding plurality of predefined causes of traffic channel congestion conditions, wherein at least one of the plurality of predefined causes comprises a sporting event or a concert;
stores, in the non-transitory memory, the plurality of condition codes and the plurality of predefined causes of traffic channel congestion conditions of a radio access network,
makes a call origination attempt, wherein the call cannot be completed initially because a traffic channel congestion condition prevents use of a wireless traffic channel of the radio access network;
receives a message, by the cellular radio transceiver via a control channel of the radio access network, that comprises a condition code of the plurality of condition codes,
determines the traffic channel congestion condition that prevents use of the wireless traffic channel of the radio access network by converting the condition code to the corresponding predefined cause of the plurality of predefined causes of the traffic channel congestion condition, and
presents, on the display, information about the traffic channel congestion condition including the predefined cause when the cellular radio transceiver fails in the call origination attempt, wherein when the traffic channel congestion condition decreases and the wireless traffic channel becomes available, a call between the mobile phone and a called party identified in information from a call set-up queue is automatically connected.

15. The mobile phone of claim 14, wherein the application further transmits information about the traffic channel congestion condition to a serving base transceiver station via the cellular radio transceiver.

16. The mobile phone of claim 14, wherein the application determines the traffic channel congestion condition based on determining that a predefined number of call origination attempt failures over the wireless traffic channel have occurred within a predefined time window.

17. The mobile phone of claim 14, wherein the sporting event comprises at least one of a baseball game, a football game, a hockey game, or a basketball game.

18. The mobile phone of claim 14, wherein the application updates the mapping of the plurality of conditions codes to the plurality of predefined causes of the traffic channel congestion conditions based on a message received via the cellular radio transceiver.

19. The method of claim 14, wherein the message further comprises an expiration period for the mapping.

20. The method of claim 14, wherein the information about the traffic channel congestion comprises an estimate of a time delay to expect before the traffic channel congestion condition dissipates such that the wireless traffic channel is made available for a first time to connect the mobile phone to the called party over the wireless traffic channel.

* * * * *